Dec. 8, 1953 C. J. H. A. STAAL 2,662,117

MULTIPLEX TRANSCEIVING ARRANGEMENT

Original Filed Oct. 18, 1948

INVENTOR.
CORNELIS JOHANNES HENRICUS ANTONIUS STAAL

BY Fred M Vogel

AGENT.

Patented Dec. 8, 1953

2,662,117

UNITED STATES PATENT OFFICE 2,662,117

MULTIPLEX TRANSCEIVING ARRANGEMENT

Cornelis Johannes Henricus Antonius Staal, Eindhoven, Netherlands, assignor to Hartford National Bank and Trust Company, Hartford, Conn., trustee Original application February 18, 1948, Serial No. 9,167. Divided and this application May 22, 1951, Serial No. 230,861

Claims priority, application Netherlands March 5, 1947

2 Claims. (Cl. 179—15)

Figure 1:
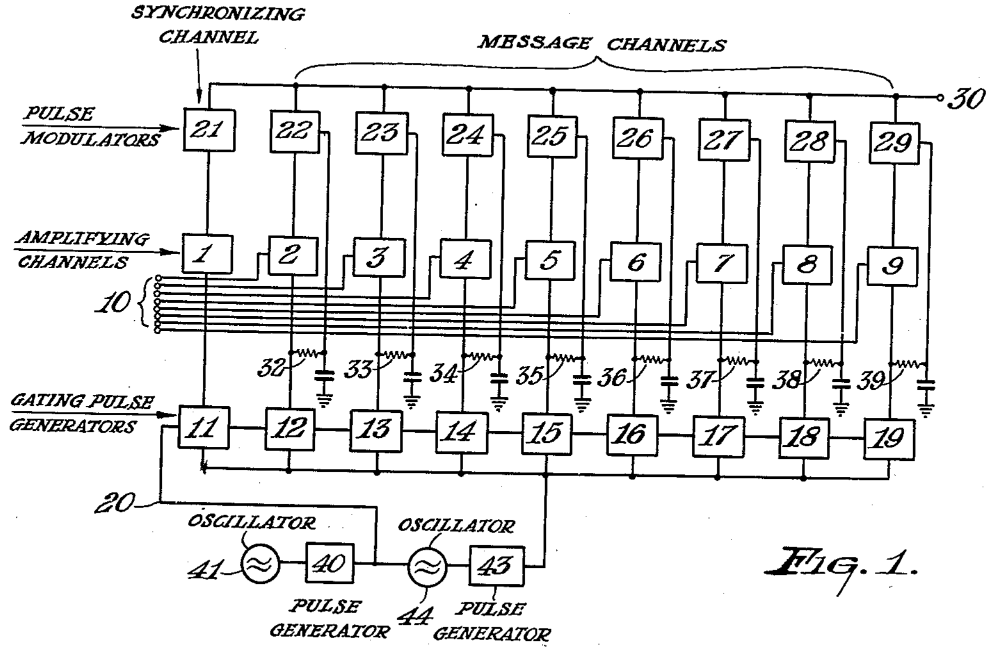

This invention relates to a multiplex transceiving arrangement comprising a number of transmitting channels which are released periodically and successively by so-called gating-pulses and may be used for telephone or telex connections.

In such a device the transmission channels are periodically released for a short time during every system cycle by different pulses of the series of gating pulses occurring in a cycle.

These series gating pulses are used both at the transmitting side and at the receiving side and should be exactly isochronous, in connection with which usually one of the transmission channels is used for transmitting one synchronisation pulse per transmission cycle.

Hereinafter the repeater frequency of the transmission cycli and synchronisation pulses will be called the cycle frequency, the higher frequency by means of which the different transmission cycles are successively switched on being called the switching frequency.

In such a multiplex system it is known to transmit the signals by pulse-duration or pulse-phase modulation, it being customary to superpose at the transmission side each of the signals to be transmitted, for obtaining corresponding pulses modulated in duration or phase, on a sawtooth voltage of switching frequency, and to feed the voltage thus obtained to a threshold device, as a result of which pulses are obtained, of which the duration depends upon the signal in question. By differentiation of these pulses phase-modulated pulses are produced. If desired, a pulse generator may be used directly behind the threshold device, which generator supplies pulses of constant duration, thus obtaining pulse-phase modulation without using a differentiating network.

According to another known method for obtaining pulse-duration or pulse-phase modulation, the modulating voltage is first translated into a stepped voltage varying discontinuously with the time and this voltage is supplied to a threshold device after adding a sawtooth voltage of switching frequency.

It is not necessary that the aforesaid voltage which varies in a linear relationship with the time and will further be called mixing voltage, should have a frequency corresponding to the switching frequency. For instance, the mixing voltage may have a fundamental frequency corresponding to the cycle frequency (for instance Wireless World, June 1946, page 187 ff. "Details of Armystation No. 10).

The mixing voltages required in connection with the modulation-translation for the various channels may, in certain systems, be taken from a common sawtooth generator which is synchronised by/the cyclus synchronisation pulses.

At the receiving side a voltage linearly varying with the time or a mixing voltage is used again for demodulation of the incoming pulses. For instance, pulses depending in duration upon the momentary amplitude of the signal to be transmitted, for suppressing the influence of undesired extensions of the pulses, e. g. due to parasitic reflections or echo phenomena, after differentiation and subsequent limitation in amplitude and duration of the pulses, are multiplicatively mixed with a saw-tooth voltage, thus obtaining pulses with an amplitude varying in accordance with the transmitted signal.

In the event of impulse-phase modulation the incoming pulses, after amplitude-detection for obtaining the initial signal, can directly be mixed multiplicatively with the mixing voltage.

In this case also the required mixing voltages can be generated by means of one or more sawtooth generators synchronised by the transmitted synchronisation pulses.

The invention has for its object to simplify multiplex transceiving arrangements of this type, which simplification moreover affords particular advantages.

According to the invention, the mixing voltage required for each channel in transceiving arrangements of the kind referred to is obtained by integration of the gating pulses by which the channel in question is periodically released.

The network used for integration of the gating pulses preferably has a time constant exceeding the duration of a gating pulse (for instance two to three times as great).

In using the invention sawtooth generators can be dispensed with and, moreover, an extremely exact coincidence between the gating pulses and the mixing voltages is naturally ensured; this is not the case in the conventional arrangements where it involves crosstalk and other disturbances.

Figure 2:
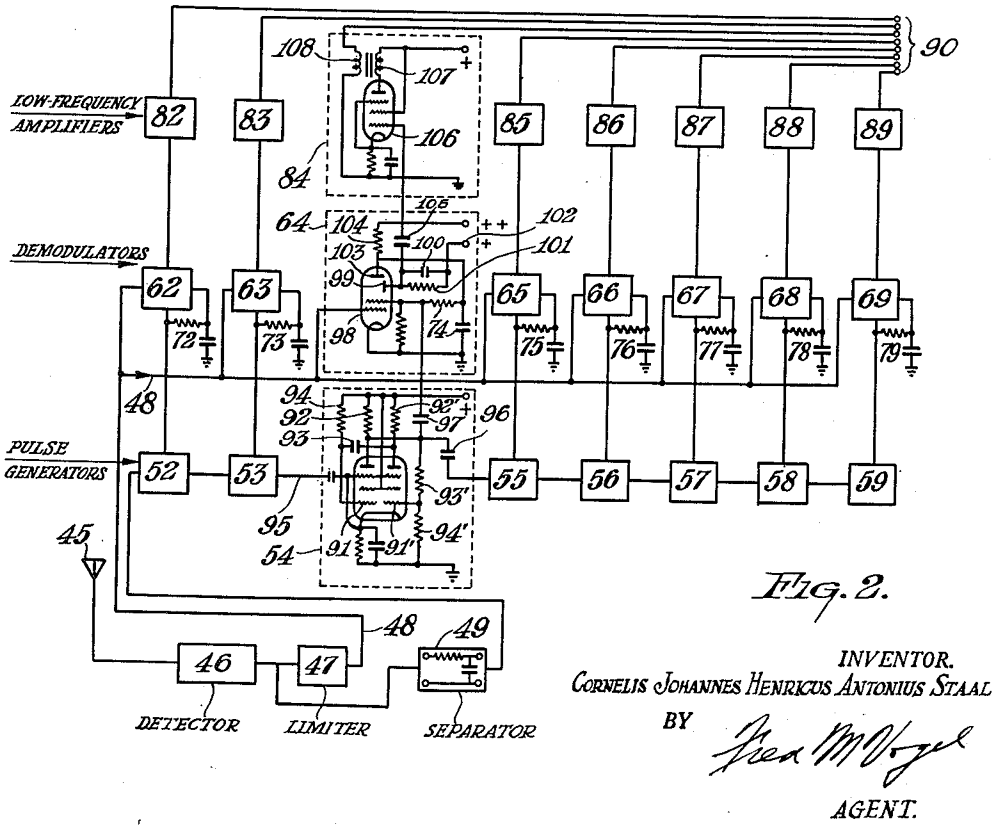

In order that the invention may be more clearly understood and readily carried into effect, it will now be described more fully with reference to the accompanying drawing, given by way of example, in which Figs. 1 and 2 represent diagrams of a multiplex transmitting arrangement and a multiplex transceiving arrangement respectively.

The executional example given in Figure 1 represents a multiplex transmitter comprising nine transmission channels 1 to 9, of which the first channel 1 serves for the transmission of cycle-synchronisation pulses and the remaining channels constitute, for instance, conversation channels. At 10 the input terminals are shown separately.

The transmission channels are alternately released, in the rhythm of the switching frequency, by gating pulses from a number of pulse modulators 11 to 19, the number of which corresponds with the number of channels and each of which supplies one of the pulses of a series of gating pulses.

The series of pulse-generators are operated in the rhythm of the cycle frequency by a cycle synchronisation pulse which is supplied to the first pulse-generator 11 through a lead 20 and is taken from a pulse-generator 40 which is synchronised by a sinusoidal voltage of cycle-frequency supplied by the oscillator 41. Every time upon the occurrence of a cycle synchronisation pulse the pulse-generators 11 to 19 excite each other in succession, termination of the gating pulses being initiated by switching pulses supplied through the lead 42 in parallel-connection to all pulse generators. The last-mentioned pulses, which occur in the rhythm of the switching frequency are produced by a pulse generator 43 which is synchronised by an oscillator arrangement 44 supplying the switching frequency and being, in its turn, synchronised by the pulse generator 40 so that the repeater frequency of the switching pulses is a whole multiple (in the present case ninefold) of the cycle frequency.

At the output side the amplifiers 2 to 9 are connected to pulse modulators 22 to 29 respectively, which supply pulses of constant repeater frequency and duration but with a phase which depends upon the momentary amplitude of the low-frequency signal of the amplifiers 2 to 9. The gating pulse which serves as a synchronisation pulse is amplified in the synchronisation channel 1, 21. The pulse modulators 22 to 29 and the amplifier 21 are connected in parallel at the output side and connected to an output terminal 30 which may be connected to the modulator for a carrier wave to be transmitted.

The pulse modulators may, for instance, each comprise an amplifying tube connected as a pulse generator and having two control grids to which the low-frequency signal and a mixing voltage linearly varying with time are supplied respectively, this tube acting at the same time as a threshold device owing to a high negative bias on one of the control grids.

The required mixing voltage linearly varying with the time is obtained, according to the invention, in each channel by integration of the gating pulses appearing in the channel in question. To this end integrant networks 32 to 39 consisting of the series-connection of a resistance and a condenser are connected to the pulse generators 12 to 19.

To insure sufficient linearity of the mixing voltage appearing at the condensers of the integrant networks, the time constant of these networks is so chosen as to exceed the duration of a gating pulse so that, for instance with a (customary) amplitude of the gating pulses of 50 to 60 volts the amplitude of the mixing voltage may amount to 5 to 10 volts, which without amplification, will generally be sufficient for the purpose aimed at, for instance with a maximum amplitude of approximately 2 to 4 volts of the low frequency signal supplied to the pulse modulator.

The condensers of the integrant networks 32 to 39 become discharged during the blocking time of the amplification channels 1 to 9 in question, which time materially exceeds the duration of a gating pulse and is consequently amply sufficient for ensuring a substantially complete discharge of the condensers with the said choice of the time constant.

Fig. 2 represents a multiplex receiving device for receiving signals which are transmitted, for instance, by the transmitting arrangement shown in Figure 1 and represent eight different calls. Eight phase-modulated pulses of short duration and a synchronisation pulse of longer duration are received per transmission cyclus. The signals picked up by the aerial 45 are supplied, after high-frequency amplification and amplitude detection 46, on the one hand to a device 47 having an output lead 48 and by which the detected pulses are limited in amplitude and duration, and on the other hand to a device 49 for separating synchronisation pulses and signal pulses which device may fundamentally consist of an integrant network.

The synchronisation pulses are supplied through the lead 50 to the first of a number of pulse-generators 52 to 59 corresponding with the number of channels, which generators excite each other in succession and each supplies one of eight succeeding positive gating pulses which release successively the impulse-phase demodulators 62 to 69 that are included in the different receiver-channels and to which the incoming signal pulses are supplied in parallel connection through the lead 48.

The mixing voltage linearly varying with time and required for impulse-phase demodulation is produced in each channel by integration of the gating pulses operative therein by means of integrant networks 72 to 79, and supplied to the impulse-phase demodulators 62 to 69. The obtained low-frequency signal voltages are supplied, if desired through the filters suppressing the impulse repeater frequency, to low-frequency amplifiers 82 to 89 comprising separated output circuits 90.

The diagram represented in Fig. 2 shows in detail the third receiving channel 64, 84 and associated gating pulse generator 54 of the uniform receiving channels; this channel will be explained more fully hereinafter.

The gating pulse generator comprises two pentodes 91, 91′ which are housed in a single tube and comprise separate anode-resistances 92, 92′, interconnected suppressor grids and screen-grids and a common cathode. The pentodes are coupled crosswise by means of a condenser 93 and a resistance 93′ so that they cut off one another mutually.

This arrangement which is known per se exhibits only two stable working points. At the first working point, which will hereinafter be called the state of rest, the pentode 91 carries the maximum anode current and the pentode 91′ is cut off. At the second working point the situation is reversed and the pentode 91 is cut off, whereas the pentode 91′ carries current. Due to the crosswise coupling the changing over from one working point to the other occurs very rapidly. By applying a high positive bias to the control grid of the pentode 91 (across resistance 94) the pentode 91 will normally carry current, the voltage set up at a grid-resistance 94′ of the pentode 91′, which grid-resistance, together with the coupling resistance 93' constitutes a voltage divider connected between the anode of the pentode 91 and earth, being insufficient for suppressing the cutting off of the pentode 91' which is caused by a cathode resistance preferably common to all pulse generators.

On termination of a gating pulse produced by a pulse generator 53 preceding the pulse generator 54 a negative pulse is supplied, through the coupling lead 95, to the control grid of the pentode 91, which impulse causes the pulse generator 54 to tip over from the state of rest into the operative state. After a lapse of time substantially determined by the charging time of the coupling condenser 93 the pulse generator resumes automatically its state of rest, and at the same time a negative voltage pulse is produced by which the following pulse generator 55 is excited through the intermediary of a coupling condenser 96.

During the time in which the pulse generator 54 is not in the state of rest, a rectangular positive voltage impulse occurs at the anode resistance 92 of the pentode 91, which impulse serves as a gating pulse for the third receiving channel and effects, through the coupling condenser 97, the release of the normally cut off impulse-phase demodulator 64.

The impulse-phase demodulator comprises a secondary emission tube 98 having a control grid to which the phase-modulated signal-pulses are supplied through the lead 48, it furthermore comprising a screen-grid which serves as a second control-grid and to which the gating pulses from the pulse generator 54 are supplied, a secondary-emission auxiliary cathode 99 which is connected to the positive anode voltage terminal 102 through an auxiliary cathode resistance 101 shunted by a condenser 100, and an anode 103, comprising an anode resistance 104.

In the impulse phase demodulator use is made of a special property of a secondary emission tube and more particularly the following: If the anode potential is lower than the auxiliary cathode potential, secondary electrons dislodged at the auxiliary cathode will for the greater part return to the auxiliary cathode so that a positive auxiliary cathode current is produced. If, however, the anode potential exceeds the auxiliary cathode potential, the secondary electrons leaving the auxiliary cathode will exceed in number those of the primary electrons impinging on this cathode and a negative auxiliary cathode current occurs. If the anode supply voltage used for the auxiliary cathode is lower than that which is used for the anode, and the auxiliary cathode lead comprises a resistance which is large in comparison with the anode resistance, a state of equilibrium is established owing to the aforesaid reversal of polarity of the auxiliary cathode current in such manner that the auxiliary cathode potential steadily attains a value practically corresponding to the anode potential. With a low time constant for the current carrying auxiliary cathode circuit the establishment of this state of equilibrium accordingly occurs rapidly. In the event of the tube being cut off, however, the potential of the auxiliary cathode will not be able to follow the anode potential in the case of variations thereof.

In the present case the aforesaid property explicitly described in Patent Application No. 711,689, now Patent No. 2,500,863, issued March 14, 1950 is utilised for impulse-phase demodulation. From the gating pulse a mixing voltage increasing linearly with the time during the gating pulse is derived by means of an integrant network 74. The mixing voltage thus obtained is supplied directly to the anode of the demodulating tube 98. By providing that the tube 98 carries current only with a signal impulse occurring during a gating pulse, the auxiliary cathode acquires the anode potential every time occurring during a signal pulse, and consequently acquires a potential which depends upon the phase of the signal pulse and is maintained, by the condenser 100 shunting the auxiliary cathode resistance 101 until the appearance of a following signal pulse. In this event the low-frequency signal having superposed on it a wave voltage of pulse-repeater frequency as a fundamental frequency is produced at the auxiliary cathode 99; however, the amplitude of this wave voltage is comparatively small so that it may, if desired, be suppressed by a simple low-pass filter.

In the executional example the signal voltage set up at the auxiliary cathode 99 is supplied, through a condenser 105, to a pentode output amplifying tube 106 comprising an output transformer 107, of which the secondary winding 108 is connected to the output terminal for the third receiving channel in question.

What I claim is:

1. In a pulse communication multiplex system wherein pulse trains are transmitted periodically, each pulse in said train having a characteristic depending on the instantaneous amplitude of an individual intelligence signal, receiving apparatus comprising a plurality of demodulators each responsive to a rectangular gating pulse and arranged to mix an applied pulse with a saw-tooth voltage to produce an output signal having an amplitude depending on the characteristic of said pulse, a like plurality of pulse generators each producing a rectangular pulse in response to an applied triggering voltage, said generators being connected in cascade relation whereby the actuation of the first generator in said cascade sequentially actuates the succeeding generators, means to apply a triggering voltage to the first generator in said cascade having a periodicity corresponding to the periodicity of said trains, means to apply the rectangular pulse developed by each of said generators to a respective demodulator to render same operative, an integrating network coupled to the output of each of said generators to convert the rectangular pulse produced therein into a saw-tooth voltage, and means to apply said saw-tooth voltage to a respective demodulator for mixing with the pulse applied thereto.

2. Receiving apparatus, as set forth in claim 1, wherein said integrating network has a time constant exceeding the duration of a gating pulse.

CORNELIS JOHANNES HENRICUS ANTONIUS STAAL.

References Cited in the file of this patent

UNITED STATES PATENTS

| Number | Name | Date |
|---|---|---|
| 2,445,775 | Grieg | July 27, 1948 |
| 2,447,233 | Chatterjea | Aug. 17, 1948 |